United States Patent [19]

Beer

[11] Patent Number: 4,464,220
[45] Date of Patent: Aug. 7, 1984

[54] METHOD AND APPARATUS FOR LAMINATING A DRIED ADHESIVE FILM TO A SUBSTRATE

[75] Inventor: Michael W. Beer, Chesterfield, England

[73] Assignee: Eurobond Coatings Limited, Nottingham, England

[21] Appl. No.: 396,735

[22] Filed: Jul. 9, 1982

[30] Foreign Application Priority Data

May 28, 1982 [GB] United Kingdom ............... 8215782

[51] Int. Cl.³ ............................................. B32B 31/12
[52] U.S. Cl. ................................... 156/273.3; 118/68;
118/642; 156/275.7; 156/379.9; 156/499;
156/555; 427/55
[58] Field of Search ............. 156/273.3, 275.7, 379.9,
156/499, 555; 427/55; 118/642, 68

[56] References Cited

U.S. PATENT DOCUMENTS

| | | | |
|---|---|---|---|
| 2,788,838 | 4/1957 | Crabbe et al. | 156/379.9 X |
| 3,658,620 | 4/1972 | Hall | 156/273.5 |
| 3,869,330 | 3/1975 | Anderson et al. | 156/379.9 |
| 3,923,585 | 12/1975 | Vouillemin | 156/379.9 |
| 3,981,762 | 9/1976 | Davis et al. | 156/273.3 X |
| 4,218,285 | 8/1980 | Durr et al. | 427/55 X |
| 4,225,376 | 9/1980 | Berg | 156/273.3 |
| 4,311,731 | 1/1982 | Messer | 427/55 X |

FOREIGN PATENT DOCUMENTS 549160 11/1941 United Kingdom .
1586591 3/1981 United Kingdom .

Primary Examiner—Robert A. Dawson
Attorney, Agent, or Firm—Trexler, Bushnell & Wolters, Ltd.

[57] ABSTRACT

The invention relates to a method and apparatus for laminating a film (e.g. of transparent polypropylene) to a substrate (e.g. paper stock bearing printed matter). The method and apparatus comprises coating the film at a station incorporating a pair of contra-rotatable rollers rotatable about parallel, horizontal axes and defining a nip. One roller has a portion of its periphery immersable in a bath of water-based adhesive, (e.g. a mix of ethylene and vinyl acetate). The coated film is stripped from the roller and fed to a first infra-red heater tuned to a frequency which evaporates the water content of the adhesive; a laminating station comprising a first pair of contra-rotatable pinch rollers comprising a metal roller and a rubber roller rotatable about parallel axis and defining a nip; a second infra-red heater, also tuned to a frequency that activates the solids of the adhesive adhering to the film; and a second pair of pinch rollers comprising two metal rollers defining a nip.

30 Claims, 1 Drawing Figure

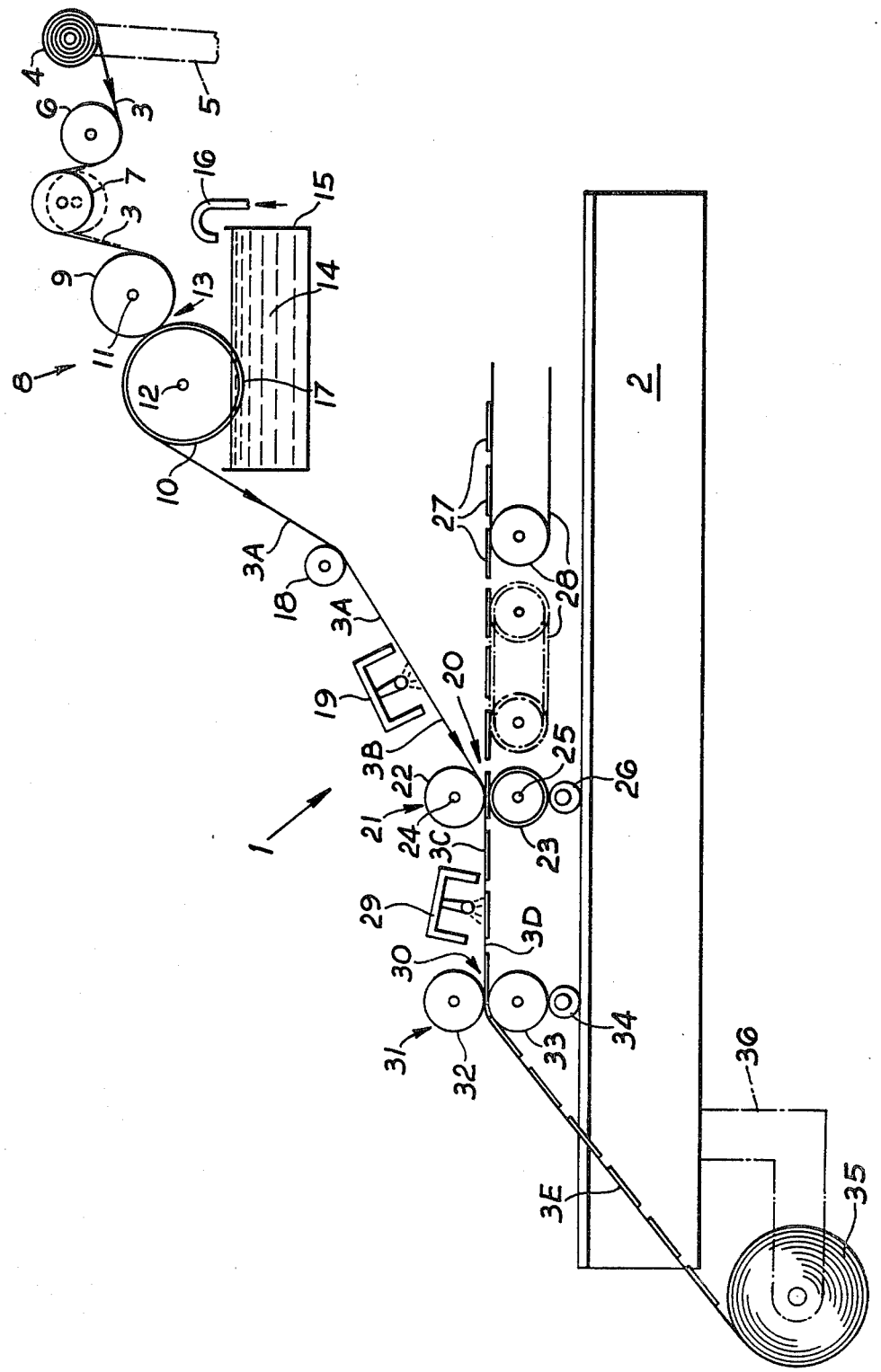

METHOD AND APPARATUS FOR LAMINATING A DRIED ADHESIVE FILM TO A SUBSTRATE

This invention relates to a method and a machine for laminating a film to a substrate. Known laminating methods and machines are employed for the production of "glossy" brochures, record sleeves etc., with the film in the form of a transparent synthetic plastics material, to give durability and protection to printed matter carried by a paper or card substrate.

In British Patent Specification No. 1,586,591 are discussed the advantages to be attained if a water based adhesive, in contrast to the more commonly employed spirit based adhesive, can regularly produce a laminated product of satisfactory quality, and a method and machine are disclosed for operating with water based adhesives. However, the provision of an adhesive reservoir at a nip defined by a pair of abutting rollers and the replenishment of that reservoir from a single supply head located midway of the length of the rollers, has been found to give an adhesive of inconsistent quality along the length of the reservoir due, it is thought, to the adhesive being relatively lightly worked and/or stirred at the reservoir, with a disadvantageous different coating weight being attained at the center zone of the rollers, compared with the end zones of the rollers. This is due to what appears to be a slight thixotropy effect in the adhesive, but more probably results from the cohesive nature of the adhesive. Furthermore, the provision of a multiple number of supply heads has not been found to eliminate this problem to any great extent. Another difficulty caused by this prior art roller configuration is the gradual increase in coating weight along the length of film because the roller(s) become contaminated by the change in water/solids proportion caused by the working effect of the rollers on the adhesive. Additionally, the use of a heated roller, to drive off some or all of the water before the laminating step is effected, has been found in some circumstances to have an adverse effect on the physical characteristics of the film. In addition, if the substrate is in the form of individual sheets, as is frequently the case, it is not possible to overlap adjacent sheets satisfactorily if there is insufficient unprinted area on the stock, and usually, wasteful large unprinted areas must be left, to assist the laminating step.

The object of the present invention is to provide an improved method and machine for the laminating of a film to a substrate, while still maintaining the advantages accruing from the use of water based adhesive.

According to a first aspect of the present invention, there is provided a method of laminating a film to a substrate, comprising feeding the film to a coating station comprising a pair of contra-rotatable rollers rotatable about parallel, horizontal axes with adjacent roller peripheries in closely spaced relationship to define a nip and with one roller being a metal roller and the other roller being compressible and having a portion of its periphery immersed in a bath of water based adhesive, and at least one of the rollers being adjustable in position with respect to the other roller to adjust the nip dimension and hence provide control of the coating weight applied to the film; stripping the coated film from the compressible roller; subsequently drying the coating in a contactless manner, by means of a first infra-red heating means tuned to a frequency which evaporates all, or substantially all, of the water content of the adhesive, so that only the solids remain, but leaves the physical condition of film unaffected, or substantially so; feeding the film, with its "dry" adhesive coating past a second infra-red heating means, also tuned to a frequency that activates the solids of the adhesive that are adhering to the film, but leaves the physical condition of the film unaffected, or substantially so, such that the solids are remelted; and thereafter passing the film to a laminating station comprising a pair of contra-rotatable pinch rollers rotatable about parallel, horizontal axes, with adjacent roller peripheries in closely spaced, adjustable relationship so as to define a nip, the film being fed, in contact with the substrate to which it is to be laminated, through the nip so defined, with the laminated product emerging from the other side of the nip.

According to a second aspect of the present invention, there is provided a machine for laminating a film to a substrate, comprising a coating station incorporating a pair of contra-rotatable rollers rotatable about parallel, horizontal axes, with adjacent roller peripheries in closely spaced relationship and with one roller being a metal roller and the other roller being compressible and having a portion of its periphery immersable in a bath of water based adhesive, and at least one of the rollers adjustable in position with respect to the other roller to adjust the nip dimension and hence provide control of the coating weight applied to the film, means to strip the coated film from the compressible roller; a first infra-red heating means tuned to a frequency which evaporates all, or substantially all, of the water content of the adhesive so that only the solids remain, but leaves the physical condition of the film unaffected, or substantially so; a second infra-red heating means, also tuned to a frequency that activates the solids of the adhesive adhering to the film, but leaves the physical condition of the film unaffected, or substantially so, such that the solids are remelted as the film, with its "dry" adhesive coating, is fed past the second heating means; a laminating station, comprising a pair of contra-rotatable pinch rollers rotatable about parallel axes with adjacent roller peripheries in closely spaced, adjustable relationship so as to define a nip, the film, in contact with the stock to which it is to be laminated being fed into the nip, with the pinch rollers squeezing the film and substrate together, to obtain intimate bonding, which grows in strength as the laminate cools.

Because, in accordance with the invention, the adhesive is collected from the bath via the compressible roller of the coating station, the adhesive is in the same condition along the entire length of the compressible roller. Furthermore, tests have shown that because the adhesive being delivered to the nip of the coating station is being taken from a relatively large bath, which is continuously being replenished, and continuously being stirred by the passage of the compressible roller periphery through the bath, the compressible roller receives minimum adhesive contamination and the build-up of adhesive deposits is limited, even over long periods of use. The method and machine of the invention produce a finely distributed, dense coating of solids after the water phase has been evaporated.

As with all forms of coating, the solvent of a solution or the emulsifier of an emulsion is required primarily to carry the solids, and with a water based adhesive, the water phase is only important at the film coating stage. If all the water is carried by the wetted film onto a substrate in the form of paper or board stock, this will inevitably result in stock distortion, due to overwetting. As the solids distribution has been improved by the adhesive collection technique of the present invention, the water can now be dried off from the wetted film and the solids used to better effect.

A fundamental advantage with this approach is the effect on one of the oldest, and to date insoluble, problems associated with print lamination—that of the presence of anti-setoff spray powders. Printers find it necessary to use such powders to keep heavily inked areas of print separated whilst those areas are drying, by oxidation, to prevent marking—by setoff—of printed sheets as they are stacked one on top of the other. In detail, finely ground powder particles (most commonly starch) are sprayed by printers onto the sheets in the course of printing. Because, in accordance with the invention, the solids are being used more effectively than in prior art proposals, with little or no water applied to paper or board stock, the powder is at least in part buried, thus eliminating the visual distortion of the finished laminate conventionally caused by the hygroscopic nature of starch. Also, the hot, tacky solids adhere to the paper stock immediately, whereas with a water phase, there is almost no tack. Furthermore, it is possible to overlap directly onto heavily printed areas of card or paper stock.

In addition, as the water phase can, in accordance with the invention, be completely eliminated, the substrate can also be in the nature of a synthetic plastics film.

Conveniently, the film is of isostatic polypropylene e.g. of 12.5 microns thickness, which is a "soft" low temperature softening material, allowing approximately 90% transmission of short wave infra-red radiation, while the adhesive is conveniently a mix basically of ethylene and vinyl acetate. Obviously, the nature of the adhesive, or parts of it, should be chosen—within the limits imposed by the characteristics of the film and paper or board stock—to best receive the heat energy and react to it by softening rapidly. For instance, almost total transmission of infra-red (I.R.) radiation through the film can be effected, and yet the radiation be absorbed by the adhesive. If there is a vinyl acetate component in the adhesive, spectroscopy shows a peak of absorbtion of I.R. at wave length 5.7-5.8 microns, whereas there is no such peak in the I.R. characteristic of polypropylene film. Having chosen an adhesive component which can best be heated without affecting the film, the tune heating means softens the adhesive coating and raises the temperature above its glass transition point (T.G.). The application of such a heated copolymer coating to a chemically suitable material with rapid cooling below T.G. forms a superb bond. By physical law, at such short wave lengths there is a limit to the I.R. energy which will be absorbed by materials only 12.5 microns in thickness, particularly when they are clearly transparent.

Preferably, at the coating station, the compressible roller is of larger diameter than the metal roller. It is also preferred for the metal roller to have a slower peripheral speed than the compressible roller. Conveniently, the latter comprises a metal core to which is secured a peripheral sleeve of rubber, synthetic rubber, compressible synthetic plastics etc., while the metal roller may be of steel, with a chrome plated periphery. Adjustment of the relative axes of rotation of the rollers at the coating station, to obtain the desired coating weight of adhesive, results in the production of an indented or flattened chord area of the surface of the compressible roller opposite the periphery of the metal roller, while the slower peripheral speed of the latter produces a shearing effect on the adhesive, to break the cohesive character thereof, which enables a thinner adhesive coating to be applied to the film than would otherwise be possible without substantial increases in the dimensions and hence costs, and power requirements of the rollers of the coating station.

Preferably, the bath is contained in a tank located beneath the compressible roller such that the tank can be lowered to a position where the lowermost periphery of the compressible roller becomes exposed and does not collect adhesive, which is convenient at the end of a laminating run and/or when the cleaning of one or both rollers of the coating station is required.

At the second heating means, a slightly shorter wave length is conveniently employed than at the first heating means, such that not only the solids but also dark colours of the substrate are activated.

The pinch rollers may comprise one metal roller and one compressible roller, located one above the other with the compressible roller being the lower roller, and their relative positions are again preferably adjustable, so that differing stock/substrate thicknesses can be readily accommodated by the machine. Conveniently, adjustment is effected at the lower, compressible roller, e.g. by a cam arrangement.

In a preferred machine, two sets of pinch rollers are provided, with the second set of pinch rollers comprising two metal rollers, located one above the other, and their relative positions are again preferably adjustable so that differing stock/substrate thicknesses can be readily accommodated by the machine. Again adjustment is preferably effected at the lower roller e.g. by a cam arrangement. The second heating means is conveniently located intermediate the first and second set of pinch rollers.

The substrate—whether in the form of continuous lengths or individual sheets—may be fed to the laminating station by any convenient conveying means, e.g. one or more endless chain conveyors.

All the rollers, whether at the coating or laminating stations or conveyor(s) may be chain driven from a common electric motor.

Conveniently, the film is fed continuously from a reel, in which case the machine is provided with film reel support means located in advance of the coating station. Similarly, the laminated product emerging from the laminating station is also conveniently collected on a reel and necessarily the machine is provided with a laminated product reel support means located beyond the laminating station.

The film may be drawn from the reel by a pair of feed rollers, the film being fed under a first feed roller and over a second feed roller. The latter may be adjustable in position, at each end, for film flatness control, the film passing from the second feed roller to the coating station.

The invention will now be described in greater detail, by way of example, with reference to the accompanying diagrammatic drawing, which is a side elevation of a laminating machine in accordance with the invention.

In the drawing, the machine 1 comprises a base 2 provided with legs (not shown) seating on the floor and provided with side plates (not shown) for supporting, inter alia, bearings of the various rollers to be described in detail later.

Isostatic polypropylene film 3 is fed continuously from a reel 4 rotatably supported on reel support means 5 extending from the base 2 to the underside of a first feed roller 6 and over a second feed roller 7, the latter having ends which are positionally adjustable by means of cams (not shown), for film flatness control. After the second feed roller 7, the film 3 passes to a coating station 8 comprising a pair of rollers 9, 10, which are contra-rotatable about parallel horizontal axes 11, 12, the roller 9 being a chrome plated steel roller and the roller 10 being a rubber covered, steel cored roller, the arrangement being such that the peripheral speed of the metal roller 9 is slightly slower than the compressible roller 10, while the metal roller 9 is adjustable in position to provide adjustment of a nip 13 defined by adjacent roller peripheries and hence adjustment of the weight of adhesive coating applied to the film 3. A bath 14 of adhesive—basically a mix of ethylene and vinyl acetate—is contained in a tank 15, the bath 14 being replenished by adhesive supplied along a supply pipe 16 connected to a supply source (not shown). A lower periphery 17 of the compressible roller 10 is immersed in the bath 14 for adhesive pick up, the tank 15 being lowerable away from the roller 10. The coated film, now given reference numeral 3A, and wetted with an adhesive coating, is stripped from the roller 10 of the coating station 8 and passes beneath a guidance and tensioning roller 18 but as the film is only of some 12.5 microns thickness, it is not possible to indicate in the drawings the adhesive coating. Thereafter the coated film 3A is passed beneath an infra-red heating means 19 tuned to a frequency which activates the adhesive coating by evaporating the water phase, but which leaves the film physically unaffected or substantially so. The "dry" coated film, now given reference numeral 3B, then passes to a nip 20 defined between adjacent peripheries of a first pair of pinch rollers 21 comprising an upper metal roller 22 and a lower compressible roller 23 rotatable about parallel, horizontal axes 24, 25, the roller 23 being adjustable by a cam arrangement 26 with respect to the upper roller 22 to vary the dimensions of the nip 20, to accommodate various thicknesses of substrate 27 supplied to the first pair of pinch rollers 21 by a feed conveyor 28. The "dry" coated film 3B is laid on top of the individual items of substrate 27—which may for example be card or cardboard sheets bearing printed matter—and the two are passed through the nip 20 to form a pre-laminated product now given reference numeral 3C emerging from the first pair of pinch rollers 21. Thereafter, the product 3C passes under a second infra-red heater means 29 tuned to activate both the solids of the adhesive coating on the film and the darker pigments of printers inks applied to the items of substrate 27. The solids are thus remelted and the product now given reference numeral 3D is fed to nip 30 defined between adjacent peripheries of a second pair of pinch rollers 31 constituting a laminating station and comprising a metal roller 32 and a metal roller 33, adjustable by a cam arrangement 34, where finish laminating is effected, the finished product, now given reference numeral 3E, emerging from the nip 30 being collected on a reel 35 supported by arms 36 extending from the machine base.

I claim:

1. A method of laminating a film to a substrate, comprising:
    feeding said film to a coating station which comprises a pair of contra-rotatable rollers rotatable about parallel, horizontal axes with adjacent peripheries of said rollers located in closely spaced relationship to define a nip and with one of said rollers being a metal roller and the other of said rollers being compressible and having a portion of its periphery immersed in a bath of water based adhesive, and at least one of said rollers being adjustable in position with respect to the other said roller to adjust the nip dimension and hence provide control of the coating weight of adhesive applied to said film;
    stripping said film, with its adhesive coating from said compressible roller;
    subsequently drying said adhesive coating, in a contactless manner, by means of a first infra-red heating means tuned to a frequency which evaporates all, or substantially all, of the water content of said adhesive, so that only solids of said adhesive remain, but leaves the physical condition of said film unaffected;
    feeding said film, with its "dry" adhesive coating past a second infra-red heating means, also tuned to a frequency that activates said solids of said adhesive that are adhering to said film, but leaves the physical condition of said film unaffected, such that said solids are remelted;
    and thereafter passing said film to a laminating station comprising a pair of contra-rotatable pinch rollers rotatable about parallel, horizontal axes, with adjacent peripheries of said pinch rollers located in closely spaced, adjustable relationship so as to define a nip, said film being fed, in contact with the substrate to which it is to be laminated, through said pinch rollers nip, with the laminated product emerging from the other side of said pinch rollers nip.

2. A machine for laminating a film to a substrate, comprising a coating station, a pair of contra-rotatable rollers incorporated in said coating station, said rollers being rotatable about parallel, horizontal axes, with adjacent peripheries of said rollers located in closely spaced relationship and with one of said rollers being a metal roller and the other of said rollers being compressible, a bath of water based adhesive in which is immersable a portion of the periphery of the compressible roller, and at least one of said rollers adjustable in position with respect to the other of said rollers to adjust the nip dimension and hence provide control of the coating weight of adhesive applied to said film, means to strip said film, with its adhesive coating, from said compressible roller; a first infra-red heating means tuned to a frequency adapted to evaporate substantially all of the water content of said adhesive so that only solids of said adhesive remain, but to leave the physical condition of said film unaffected, a second infra-red heating means also tuned to a frequency adapted to activate, by re-melting, said solids of the adhesive adhering to said film, but to leave the physical condition of said film unaffected; a laminating station, a pair of contra-rotatable pinch rollers incorporated in said laminating station, said pinch rollers being rotatable about parallel axes with adjacent peripheries of said pinch rollers located in closely spaced, adjustable relationship so as to define a nip, said film, in contact with the substrate to which it is to be laminated being feedable into said nip, with said pinch rollers squeezing said film and substrate together, to obtain intimate bonding, which grows in strength as the laminated product cools.

3. A method as claimed in claim 1, wherein said film is of isostatic polypropylene.

4. A method as claimed in claim 1, wherein said adhesive is a mix basically of ethylene and vinyl acetate.

5. A method as claimed in claim 1, wherein at said second heating means, a slightly shorter wave length is employed than at said first heating means, such that not only said solids but also any dark colours of said substrate are activated.

6. A method as claimed in claim 1, wherein said film is fed continuously from a reel.

7. A method as claimed in claim 1, wherein said laminated product emerging from the laminating station is collected on a reel.

8. A machine as claimed in claim 2, wherein at said coating station, said compressible roller is of large diameter than said metal roller.

9. A machine as claimed in claim 2, wherein said metal roller has a slower peripheral speed than said compressible roller.

10. A machine as claimed in claim 2, wherein said compressible roller comprises a metal core to which is secured a compressible peripheral sleeve of material such as rubber, synthetic rubber, compressible synthetic plastics.

11. A machine as claimed in claim 2, wherein said metal roller is of steel, with a chrome plated periphery.

12. A machine as claimed in claim 2, wherein said bath is contained in a tank located beneath said compressible roller.

13. A machine as claimed in claim 12, wherein said tank is lowerable to a position where the lowermost periphery of said compressible roller becomes exposed and is incapable of collecting adhesive from said bath.

14. A machine as claimed in claim 2, wherein said pair of pinch rollers comprise one metal roller and one compressible roller.

15. A machine as claimed in claim 14, wherein said pair of pinch rollers are located one above the other, with said compressible roller being the lower roller.

16. A machine as claimed in claim 15, wherein adjustment of the relative positions of said pinch rollers is effected at the lower, compressible roller.

17. A machine as claimed in claim 16, werein adjustment is effected by a cam arrangement.

18. A machine as claimed in claim 2, wherein two sets of pinch rollers are provided, with said second set comprising two metal rollers.

19. A machine as claimed in claim 18, wherein said metal rollers are located one above the other.

20. A machine as claimed in claim 19, wherein the relative positions of said metal rollers are adjustable.

21. A machine as claimed in claim 20, wherein adjustment is effected at said lower roller.

22. A machine as claimed in claim 20, wherein adjustment is effected by a cam arrangement.

23. A machine as claimed in claim 18, wherein said second heating means is located intermediate said first and second sets of pinch rollers.

24. A machine as claimed in claim 2, comprising a substrate feeding means.

25. A machine as claimed in claim 24, wherein said substrate feeding means comprises at least one endless chain conveyor.

26. A machine as claimed in claim 2, wherein all said rollers, whether at said coating or laminating stations or conveyor(s), are chain driven from a common electric motor.

27. A machine as claimed in claim 2, provided with film reel support means located in advance of said coating station.

28. A machine as claimed in claim 2, provided with a laminated product reel support means located beyond said laminating station.

29. A machine as claimed in claim 2, comprising, in advance of said coating station, a pair of feed rollers.

30. A machine as claimed in claim 29, wherein one of said feed rollers is adjustable in position.

* * * * *